Figure 1:
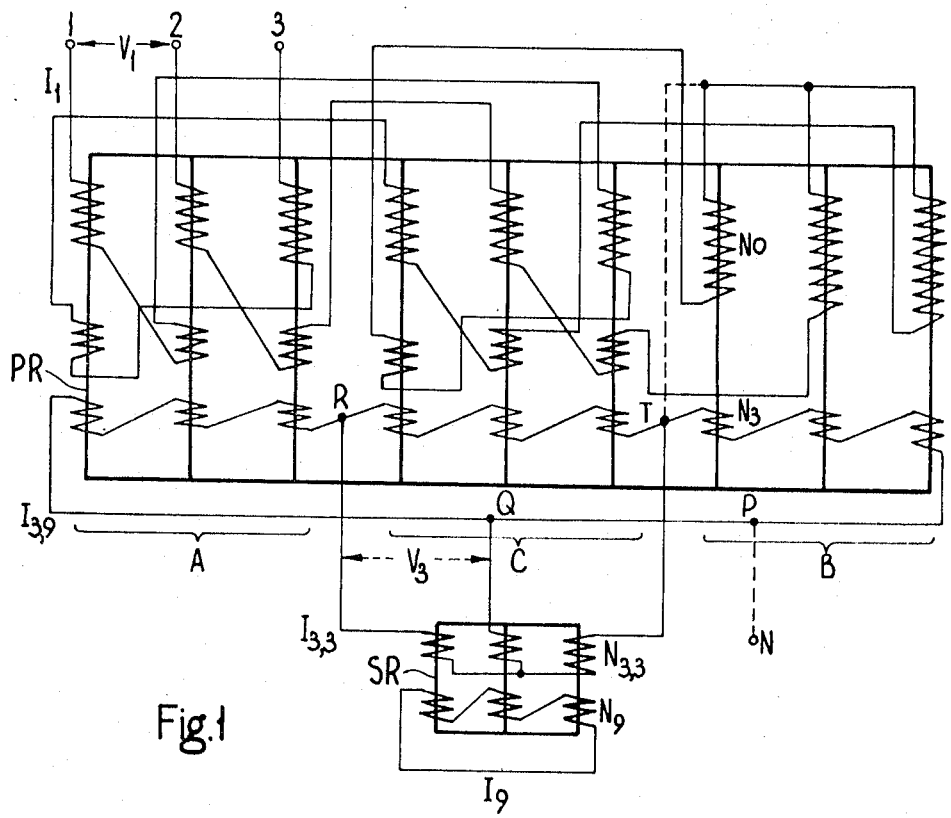

United States Patent

[11] 3,621,376

| [72] | Inventors | Erich S. Friedlander<br>Sutton Coldfield;<br>Charles P. Fletcher, Birmingham, both of England |
|---|---|---|
| [21] | Appl. No. | 32,104 |
| [22] | Filed | Apr. 27, 1970 |
| [45] | Patented | Nov. 16, 1971 |
| [73] | Assignee | The General Electric Company Limited<br>London, England |
| [32] | Priority | Apr. 28, 1969 |
| [33] | | Great Britain |
| [31] | | 21,810/68 |

[54] A POLYPHASE NETWORK VOLTAGE-STABILIZING ARRANGEMENT UTILIZING SATURATED REACTORS
17 Claims, 6 Drawing Figs.

[52] U.S. Cl. .......................................... 323/50,
323/57, 323/83, 323/85, 323/89 C
[51] Int. Cl. .................................................... G05f 3/06
[50] Field of Search ......................................... 321/9, 25,
68; 323/47, 48, 50, 53, 54, 57, 83, 85, 89 C

[56] References Cited
UNITED STATES PATENTS

| 1,926,689 | 9/1933 | Scharli | 323/47 |
| 1,930,979 | 10/1933 | Kubler | 323/47 |
| 2,783,432 | 2/1957 | Harz | 323/48 X |
| 2,891,211 | 6/1959 | Stonehouse | 323/53 X |
| 2,989,685 | 6/1961 | Kollmann | 323/47 X |
| 3,393,356 | 7/1968 | Kobayashi et al. | 321/68 |
| 3,450,981 | 6/1969 | Fletcher et al. | 323/83 X |

Primary Examiner—A. D. Pellinen
Attorney—Kirschstein, Kirschstein, Ottinger & Frank ABSTRACT: A voltage-stabilizing arrangement for three-phase alternating current networks which makes use of multicore or multilimb saturated reactors, incorporating structure for suppressing self-generated harmonics, has a group of primary alternating current saturated reactor cores provided with windings connected in shunt with the network and wound as for magnetic frequency multiplication, and compensating turns interconnected to form a closed polyphase mesh. Preferably a secondary three-phase saturated compensating treble frequency reactor has a primary winding connected in star to symmetrical treble-frequency tapping points on the closed mesh, and a secondary winding connected to form a closed short-circuited mesh.

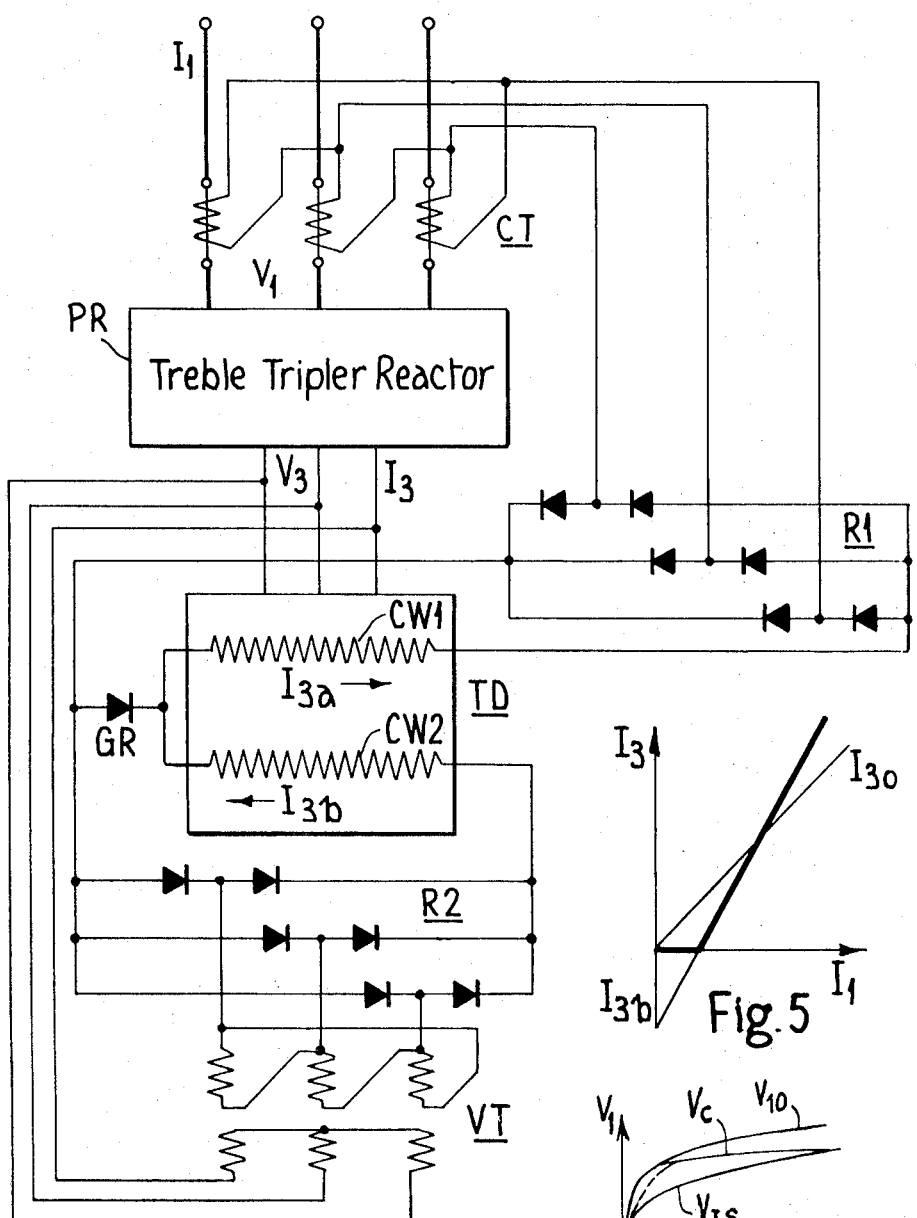
Fig. 4
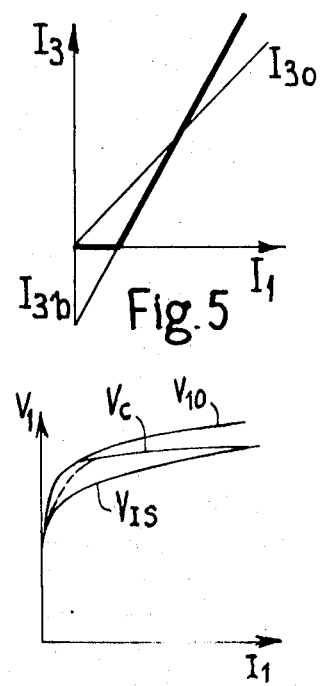
Fig. 5
Fig. 6

A POLYPHASE NETWORK VOLTAGE-STABILIZING ARRANGEMENT UTILIZING SATURATED REACTORS

This invention relates to voltage-stabilizing arrangements for alternating current networks, and is particularly concerned with arrangements which make use of multicore or multilimb saturated reactors incorporating means for suppressing self-generated harmonics.

One such arrangement has been described in our British Pat. No. 1,123,582; the arrangement incorporating a set of one or more ($p$) series connected groups of primary alternating current saturated reactors, involving a total of $n$ wound reactor cores arranged to be connected in shunt with the supply system where $n$ is at least equal to five, and $n/p$ is an integer, and wherein the $n$ reactor cores are wound in the manner employed for magnetic frequency multiplication with primary windings arranged so that corresponding core fluxes are subjected to a phase displacement of $180°/n$ relative to each other, for the suppression of harmonics below $2n-1$, and having secondary windings or equivalent arranged in the form of a $n/p$ phase mesh in each of the $p$ groups, with a compensating reactor connected into the mesh, which compensating reactor is arranged to operate itself in a saturated condition when the arrangement is in use so as to substantially reduce also harmonics of the order $2n\pm1$ over the operating range of reactor currents.

Principally the present invention relates also to voltage stabilization with the aid of saturated polyphase reactors, including suppression of harmonics, and an object of the invention is to provide a form of voltage-stabilizing arrangement which can be constructed in both a space-saving and economical manner.

Accordingly this invention resides in a polyphase network voltage-stabilizing arrangement for connection to a three-phase network, having a group of primary alternating current saturated reactor cores carrying windings connected in shunt with the said network, and wound in series multiple zigzag form as for magnetic frequency multiplication, wherein compensating turns are arranged and interconnected so as to form a closed polyphase mesh, the phase number being any multiple of three and the mesh sequence being so arranged as to provide points for connection of a three-phase treble frequency reactor.

For example the compensating windings may be connected to form a closed nine-phase mesh extending over nine cores excited with $180°19=20°$ fundamental displacement as would be required for a frequency multiplier generating a ninth harmonic secondary output, or an equivalent polyphase mesh when the secondary frequency is another multiple of three.

In other words this invention suggests in the first place, for the purpose mentioned above, the connection of a three-phase network of a ninetupler with a secondary winding that is short-circuited.

Such a treble-tripler-ninetupler can be manufactured with a nine-limb core, dispensing with extra limbs for flux return and equalization or as an 11-limb core having two unwound limbs and yokes of correspondingly reduced cross section. Consequently the iron for the flux return path can be reduced to a minimum because the sum of the fluxes in all the ($n$) wound cores of the main reactor, as well as that in the cores of any compensating reactors provided can be made zero.

Preferably there is provided a secondary three-phase saturated compensating treble frequency reactor having a star-connected primary winding connected to tapping points on the short-circuited nine-phase mesh of the primary reactor, and a secondary winding connected to form also a short-circuited mesh.

A star-connected compensating reactor connected to symmetrical treble frequency tapping points of the short-circuited nine-phase mesh winding tends to produce a three-phase treble frequency current wave which in practice can be adjusted to reduce to a negligible value the 17the and 19the harmonics so that the currents in the primary reactor winding and in the said network are nearly sinusoidal. It should be noted here that at the point of optimum compensation the secondary compensating reactor counteracts a tendency of the short-circuited ninth harmonic winding to overcompensate the 17th and 19th harmonics. For this it is necessary for the current of the compensating reactor to pass nearly linearly through zero. A plain mesh connected secondary reactor would not normally satisfy this condition, and a separate secondary compensating reactor is therefore preferably provided as above described.

Figure 2:
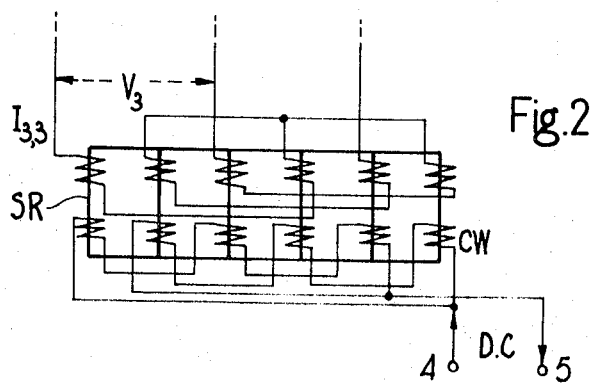
Figure 3:
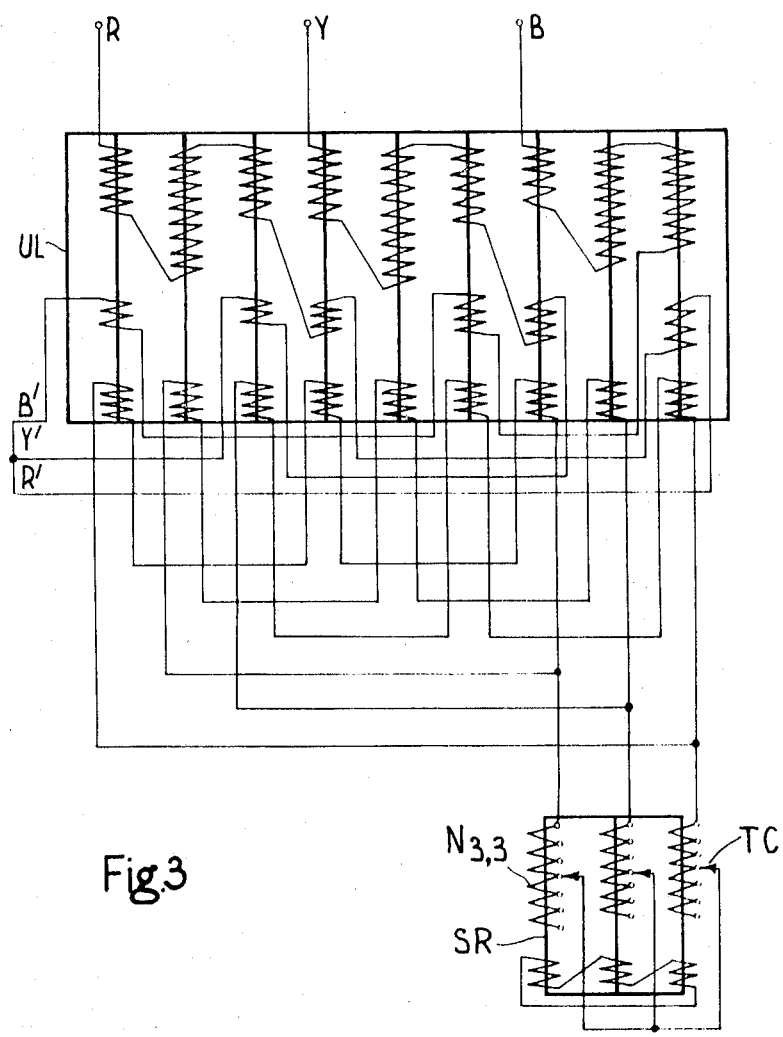

More details will become apparent and the invention will be better understood from the following description referring to FIGS. 1 to 6 of the accompanying drawing in which:

FIG. 1 shows diagrammatically and by way of example the main features of an arrangement embodying the invention, and FIGS. 2 and 3 illustrate modifications thereof, FIG. 4 shows an automatic voltage control arrangement embodying the invention, and FIGS. 5 and 6 illustrate typical characteristics for explaining the operation of the arrangement.

Referring to FIG. 1, nine limbs (shown diagrammatically for the sake of simplicity) of a saturating reactor core PR are wound with three-phase primary turns N$o$ which carry a substantially sinusodial current $I_1$ and are connected to a voltage $V_1$ between terminals 1, 2, 3, undesirable over-voltages of which are prevented by the invention. The said limbs are interconnected by iron yokes, but no unwound limbs need be provided for a flux return or equalizing path. The nine limbs with their windings N$o$, which are wound in series zigzag star as for a frequency ninetupler, form three core groups as explained in our before/ mentioned patent ($p=3$, $n=9$). The three groups are denoted A, B, C. The nine limbs are also wound with interconnected secondary turns $N_3$, traversed by a current $I_{3,9}$. The mesh connections of all $N_3$ windings is closed with respect to the ninth harmonic so as to represent a short circuit for all ninth harmonic fluxes in the nine main cores.

Tapping points Q, R, T of this closed winding are connected to a secondary three-phase compensating saturated reactor SR having a star-connected primary winding $N_{3,3}$ carrying a third harmonic-current $I_{3,3}$ and short-circuited secondary mesh turns $N_9$ which carry a current $I_9$ and thus ensure the short-circuiting of the ninth harmonic also on the compensating reactor to give the mesh desirable approximation to a sinusodial flux shape in this reactor. As shown by a dotted line a point P of the winding $N_3$ can be connected to a neutral point N, which may be isolated, or earthed if desired if a suitable turns ratio $N_3/N_0$ is selected.

FIG. 2 shows that an additional control, in transductor fashion, can be provided by inductively coupling the turns across the voltage $V_3$ and carrying the current $I_{3,3}$ to a secondary reactor control winding CW which is supplied via terminals 4, 5 with direct current, the magnitude of which within given limits can be controlled for any desired relationship between the primary and current.

The effect aimed at by the invention, that is to obtain an economical solution for a saturated reactor by suppressing ninth haromic fluxes in both the main and auxiliary saturated reactors using a short-circuited mesh of three treble-frequency windings, and a preferably controllable secondary reactor, can be achieved most economically with an arrangement according to FIG. 3.

Here the windings are interconnected to ensure that adjacent ones of the limbs linked by fluxpaths carry fluxes whose mutual phase displacement is 120° electrical of a three-phase network to be protected by the arrangement according to this invention. The network terminals are accordingly denoted R, Y, B in FIG. 3. It will be seen that unwound limbs UL are provided in addition to the nine limbs carrying windings, so that the cross section of the yoke iron can be reduced to substantially one-half, as is known per se in conjunction with shell-type transformers. This iron economy is particularly pronounced where the limbs are short in comparison with the yoke length required for a nine-wound limbs core.

Modifications are possible without departing from this invention, So for instance the core arrangement of FIG. 1 or 3 may be subdivided into any number (i.e. two to nine) separate sections each with its magnetic circuit continuity maintained by the addition of an unwound limb at the point of separation, but with interconnected turns as for the nine- or 11-limb unit as the case may be, in order to meet particular requirements, where size and weight limitations in view of transport facilities are paramount. For example a core having nine wound limbs can be subdivided in three five-limb units each comprising three wound and two unwound limbs and each of which may be housed in a separate oil-filled tank. Then each unit can be tested individually at the place of manufacture and can be carried in its sealed tank to the sites of installation for interconnection with the other two units Similarly where the reactor is split into a different number of unit sections each section can be housed in an individual oil-filled tank.

The number of effective turns of the winding $N_{3,3}$ of the secondary reactor SR may be adjustably variable, and automatically controlled in response to network voltage variations. To this end a tap changer TC, operating if desired over the whole length of this winding, can be arranged conveniently in star-connection, with the neutral star point isolated, or preferably earthed.

While a preferred winding arrangement for mutual compensation of harmonics has been shown, a reduction in the iron cross section of the yoke, as aimed at by the invention, is also possible by other sequences of excitation for the individual fluxes. For instance, the terminals 1, 2 3 could be connected to the respective turns on the three middle limbs of the core.

The $\pm 20°$ phase displacement between the zigzag groups can be achieved either with an equal internal connection and external reversal of the phase-sequence (as in FIG. 1) or with the same phase-sequence on both groups if the internal zigzag connection is reversed. The "external" reversal however will be preferable in most cases, as it simplifies the manufacture.

Where size and weight conditions permit the nine-limb core carrying the winding arrangement forms a single unit which may be accommodated in an oil-filled tank. However, separate core portions carrying the respective winding portions, and if required housed in individual tanks, can be employed if adequate iron paths are provided for the flux circulation as required to achieve harmonics compensation.

Saturated reactors of the proposed type are suitable for voltage stabilization either by DC control, tap changer control and in conjunction with series capacitors as claimed in British Pat. No. 1,123,582. They will in this context also be most suitable for automatic voltage stabilization in large networks to a constant level which is then adjustable in a most economical way and with a minimum of complexity, for instance the tap changer control as shown in FIG. 3.

It should also be noted that by gradual control of the transition between open circuit and short circuit conditions of the treble-frequency circuit the voltage can be stabilized to such a degree even that capacitors series connected to the primary winding of the saturated reactor can be dispensed with for the said purpose.

One such automatic voltage control arrangement which is illustrated in FIG. 4, utilizes as the secondary reactor a transductor TD having two control windings $CW_1$, $CW_2$ with an equal number of turns. The first of these windings $CW_1$ is arranged to carry the main direct excitation current $I_{3a}$, which is conveniently derived as shown from the primary current $I_1$ of the stabilizing arrangement through current transformers CT and rectifiers $R_1$, this direct excitation current being proportional to the said primary current with the factor of proportionality chosen so that without any correcting influence the compensating current $I_3$ would be greater than the ideal current $I_{30}$ giving optimum wave shape and a characteristic between the open and short circuit voltage characteristics $V_{10}$ and $V_{IS}$ as shown in FIG. 6 Then by adequate control of the compensating current $I_3$ a characteristic which is constant over a wide range of primary current will be obtainable. For this purpose the second control winding CW2 of the transductor TD is arranged to biassing current opposed to the main excitation current and derived from the secondary voltage $V_3$ of the stabilizer as shown (or possibly from the primary voltage $V_1$) through suitable voltage transformers VT and rectifiers R2.

It will be appreciated that if the two currents $I_{3a}$, $I_{3b}$ were permitted to develop independently with the biassing current $I_{3b}$ in the second control winding CW2 remaining substantially constant there would be strong excitation if the main excitation current $I_{3a}$ approached zero and this would bend the $V_C$ characteristics backwards towards the $V_{IS}$ characteristic as shown dotted in FIG. 6. To prevent this premature decay of the voltage $V_c$ at low currents there is conveniently provided a gate rectifier GR arranged to carry current only in the direction of the main excitation current $I_{3a}$, and arranged so that if the latter is greater than the biassing current $I_{3b}$ both currents can flow independently, but such that if the main excitation current tends to become less than the biassing current then it will prevent any difference between the two currents occurring, and therefore the ampere-turns will, below this critical current, be forced down to zero, as shown in FIG. 5.

We claim:

1. A polyphase network voltage-stabilizing arrangement for connection to a three-phase network, having a group of primary alternating current saturated reactor cores carrying windings connected in shunt with the said network, and wound in series multiple zigzag form as for magnetic frequency multiplication, wherein compensating turns are arranged and interconnected so as to form a closed polyphase mesh, the phase number is any multiple of three, and the mesh sequence is such as to provide points for connection to the mesh of a three-phase treble frequency compensating reactor, a three-phase treble frequency competing reactor being connected to the mesh at said points.

2. A polyphase network voltage-stabilizing arrangement according to claim 1, wherein the primary windings of the saturated reactor cores are wound in series zigzag star as for a frequency ninetupler.

3. A polyphase network voltage-stabilizing arrangement according to claim 1 wherein the compensating reactor is a saturated reactor having primary and secondary windings so wound that its primary current passes approximately linearly through zero.

4. A polyphase network voltage-stabilizing arrangement according to claim 3, wherein the secondary three-phase saturated compensating treble- frequency reactor has a primary winding connected in star to said points on the short-circuited secondary winding of the primary reactor, and a secondary winding consisting of a short-circuited mesh.

5. A polyphase network voltage-stabilizing arrangement according to claim 1, wherein the compensating reactor is a saturated reactor having a primary and secondary windings in which the primary winding is connected in star to symmetrical treble-frequency tapping points on the closed mesh of the primary reactor, which secondary reactor is controllable.

6. A polyphase network voltage-stabilizing arrangement according to claim 5, wherein the secondary reactor has a star-connected winding connected to said tapping points on the short-circuited secondary winding of the primary reactor, and a control winding arranged to be supplied with direct current of adjustable magnitude in use of the arrangement.

7. A polyphase network voltage-stabilizing arrangement according to claim 5, wherein the effective number of turns of the primary winding of the compensating reactor is adjustably variable.

8. A polyphase network voltage-stabilizing arrangement according to claim 7, wherein the effective number of turns of the primary winding of the compensating reactor is automatically controlled in response to network voltage variations.

9. A polyphase network voltage-stabilizing arrangement according to claim 1, wherein the compensating turns are provided in groups of three cores, the fluxes in which are displaced by 120° respectively relative to each other by a short-circuited mesh of treble-frequency windings in each core group.

10. A polyphase network voltage-stabilizing arrangement according to claim 1, wherein a secondary three-phase saturated compensating treble-frequency reactor has a primary winding connected in star to symmetrical treble-frequency tapping points on the closed mesh of the primary reactor, wherein the primary reactor has nine wound limbs.

11. A polyphase network voltage-stabilizing arrangement according to claim 10, wherein the primary saturated reactor includes two unwound limbs.

12. A polyphase voltage-stabilizing arrangement according to claim 10, wherein the primary saturated reactor core is subdivided into any mumber of separate sections each with its magnetic circuit continuity maintained by the addition of an unwound limb at the point of separation but with interconnected turns.

13. A polyphase network voltage-stabilizing arrangement according to claim 10, wherein the primary saturated reactor is subdivided into three five-limb units each comprising three wound limbs and two unwound limbs.

14. A polyphase network voltage-stabilizing arrangement according to claim 1, wherein the primary saturated reactor is subdivided into a number of separate sections with interconnected windings and each housed in a separate oil filled tank.

15. A polyphase network voltage-stabilizing arrangement according to claim 1, wherein the compensating reactor is in the form of a transductor having a pair of control windings, one of which is arranged to carry a main direct excitation current whose magnitude varies with changes in the primary current of the stabilizing arrangement by an amount giving over-compensation, and the other of which carries an adjustable biassing current opposed to the main excitation current.

16. A polyphase network voltage-stabilizing arrangement according to claim 15, wherein the main excitation current is derived from the primary current of the stabilizing arrangement through current transformers and rectifiers, and the biassing current is derived from the secondary voltage of the stabilizing arrangement through voltage transformers and rectifiers.

17. A polyphase network voltage-stabilizing arrangement for connection to a three-phase network, having a group of primary alternating current saturated reactor cores carrying windings connected in shunt with the said network, and wound in series multiple zigzag form as for magnetic frequency multiplication, wherein compensating turns are arranged and interconnected to form a closed polyphase mesh in which the phase number is any multiple of three, and the mesh sequence is such as to provide points for connection to the mesh of a three-phase treble frequency compensating reactor, said compensating reactor being in the form of a transductor having a pair of control windings, one of which is arranged to carry a main direct excitation current derived from the primary current of the arrangement through transformers and rectifiers, and whose magnitude varies with changes in the said primary current by an amount giving over-compensation, and the other of which control windings carries an adjustable biassing current opposed to the main excitation current and derived from the secondary voltage of the stabilizing arrangement through voltage transformers and rectifiers, the arrangement including also a gate rectifier connected in series with both the main excitation winding and the biassing winding and arranged to carry current only in the direction of the main excitation current such that if the latter is greater than the biassing current both currents can flow independently, but such that if the main excitation current tends to become less than the biassing current the rectifier prevents any difference between the two currents occurring

* * * * *